United States Patent [19]
Thro et al.

[11] Patent Number: 5,884,159
[45] Date of Patent: Mar. 16, 1999

[54] METHOD OF SPAWNING A COMMUNICATION SERVICE

[75] Inventors: Stuart W. Thro, Cary; David E. Morgan, Lisle; Gary W. Grube, Barrington, all of Ill.

[73] Assignee: Motorola, Inc., Schaumburg, Ill.

[21] Appl. No.: 757,202

[22] Filed: Nov. 27, 1995

[51] Int. Cl.⁶ .................................................. H04Q 7/32
[52] U.S. Cl. ........................ 455/412; 455/413; 455/426
[58] Field of Search .................................. 455/412, 413, 455/417, 426; 379/67, 88, 201, 214, 112, 114

[56] References Cited

U.S. PATENT DOCUMENTS

| | | | |
|---|---|---|---|
| 4,969,182 | 11/1990 | Ohtsubo et al. | 379/67 |
| 5,031,204 | 7/1991 | McKernan | 455/412 |
| 5,448,627 | 9/1995 | Ueno et al. | 379/88 |
| 5,459,779 | 10/1995 | Backaus et al. | 379/88 |
| 5,469,491 | 11/1995 | Morley, Jr. et al. | 379/88 |
| 5,475,739 | 12/1995 | Norimatsu | 379/88 |
| 5,583,564 | 12/1996 | Rao et al. | 379/210 |
| 5,590,178 | 12/1996 | Murakami et al. | 379/88 |
| 5,600,710 | 2/1997 | Weisser, Jr. et al. | 379/210 |
| 5,604,788 | 2/1997 | Tett | 455/412 |
| 5,664,005 | 9/1997 | Emery et al. | 455/445 |
| 5,706,329 | 1/1998 | Foladare et al. | 379/210 |
| 5,724,409 | 3/1998 | Malik et al. | 379/210 |

Primary Examiner—Dwayne D. Bost
Assistant Examiner—Jean A. Gelin
Attorney, Agent, or Firm—Susan L. Lukasik; Raymond J. Warren

[57] ABSTRACT

A method of spawning a communication service comprises the steps of detecting (201) a failed call attempt initiated by a first communication unit (101) and directed to a second communication unit (109), and determining (207) if a code associated with the first communication unit (101) is an authorized code associated with the second communication unit (109), wherein the first communication unit (101) is associated with a first user and the second communication unit (109) is associated with a second user. If the code is an authorized code, a communication service is spawned (209), resulting in a message directed at a user other than the second user, such as the first user or a third user, or a communication unit other than the second communication unit (109), such as the first communication unit (101) or a third communication unit (109), which may be associated with a third user other than the first user or the second user.

37 Claims, 3 Drawing Sheets

1

METHOD OF SPAWNING A COMMUNICATION SERVICE

FIELD OF THE INVENTION

This invention relates to communication systems, including but not limited to inter-system and intra-system communications.

BACKGROUND OF THE INVENTION

Inter-system and intra-system communications are known. Communications between wireline and wireless networks proceed regularly and transparently to the user.

It is well known that subscribers of paging systems must wear their pagers at all times when they are expecting others to contact them. The subscriber may be on the run, and forget his or her pager. When the subscriber is not on the run, he or she may advise expected callers to call the user's wireline telephone. When a user fails to answer a page, for example when the user takes off the pager to charge it, loses the pager, or forgets to turn the pager on, the page may be forwarded to the user's television, as described in U.S. Pat. No. 5,489,894 titled "Television Paging System," or some other device such as a cellular phone associated with the user. Some systems allow for a page to be forwarded into another communication system or even into another type of device, such as a cellular phone.

In cellular phone systems or wireline phone systems, call forwarding, call waiting, and voice mail are just a few of the options that a user has when the user does not answer an incoming call for any reason. Users of cellular phones may also make use of another diversion feature, commonly known as "no answer transfer," to divert an incoming call to a second predetermined phone number should the intended recipient fail to answer their cellular phone. The second phone number may be a voice mail server or another phone device where the original call recipient may be contacted.

Thus, when the recipient of a call or page does not answer the call or page, many options exist for the recipient to redirect a call or otherwise use another service such that the recipient is made aware of the call. Generally these options are referred to as diversion or notification.

The initiator of the failed call, however, has very few options. Some voice mail systems allow the caller to forward the call to another number, where someone may or may not answer the call, and that someone may or may not be able to help the initiator get the information sought.

Accordingly, there is a need for a method of providing information to the initiator of a call when the intended recipient does not answer the call.

BRIEF OF THE A PREFERRED EMBODIMENT

DESCRIPTION OF A PREFERRED EMBODIMENT

Figure 1:
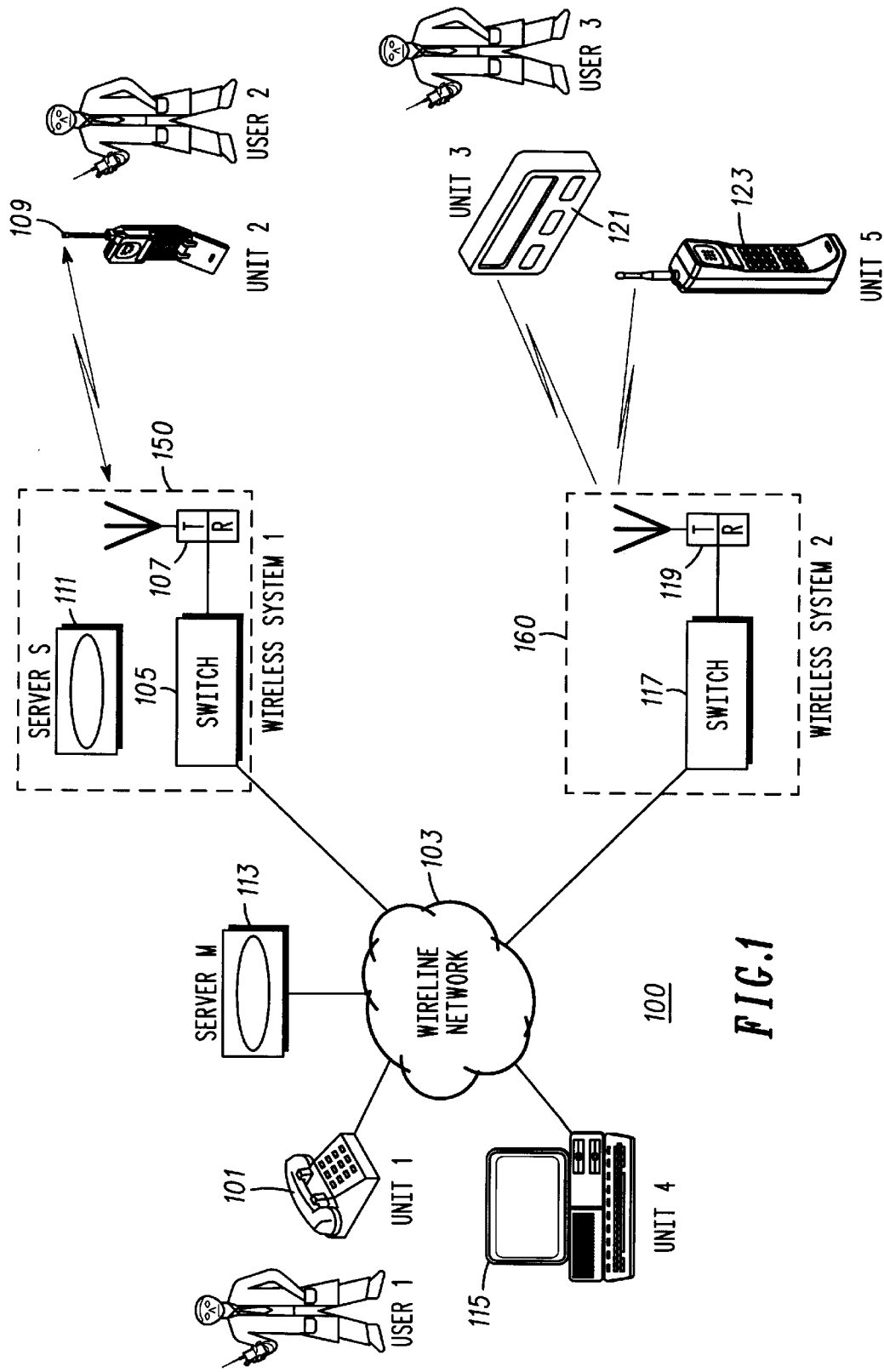
FIG. 1 is a diagram of a communication network in accordance with the invention.

The following describes a system for and method of spawning a communication service when a call attempt from a first user of a first communication unit to a second user of a second communication unit fails. The spawned communication service may be a location determination service, schedule/itinerary provision service, or stored message service. The spawned communication service may be primarily directed at a communication unit, including the first communication unit or a third communication unit. The spawned communication service may be primarily directed at a user, including the first user or a third user.

A method of spawning a communication service comprises the steps of detecting a failed call attempt initiated by a first communication unit and directed to a second communication unit, and determining if a code associated with the first communication unit is an authorized code associated with the second communication unit, wherein the first communication unit is associated with a first user and the second communication unit is associated with a second user. If the code is an authorized code, a communication service is spawned, resulting in a message directed at a user other than the second user, such as the first user or a third user, or a communication unit other than the second communication unit, such as the first communication unit or a third communication unit, which may be associated with a third user other than the first user or the second user. The communication units may transmit and/or receive voice messages and/or data messages.

In an alternative embodiment, a notification message is sent to a server informing the server of the failed call attempt. The notification message may include an identification of the first communication unit, an identification of the second communication unit, and a status opcode indicating a failed call attempt from the first communication unit to the second communication unit.

Optional features are described as follows. The code may be either a phone number associated with the first communication unit, an identification code or phone number associated with the first communication unit, or an entered password. A user of the first communication unit may also be provided with an option as to what type of spawned communication service the user desires. The detecting, determining, and spawning steps may be performed by the second communication unit and/or a server within a communication system in any combination. The message may be a voice message, a synthesized voice message, or a data message. The failed call attempt may comprise any of the following: a no-answer condition at the second communication unit; a busy condition at the second communication unit; the second communication unit is out of range of a communication system; the second communication unit is turned off; the second communication unit is malfunctioning.

The spawned communication service may be a location determination service, where the method further comprises the steps of determining a present location of the second communication unit and transmitting the present location of the second communication unit in the message; a schedule or itinerary communication service, where the method further comprises the steps of obtaining a schedule or an itinerary of a user of the second communication unit and transmitting the schedule or the itinerary of the user of the second communication unit in the message; or a stored message service, where the method further comprises the steps of obtaining a stored message associated with the second communication unit and transmitting the stored message in the message.

A diagram of a communication network 100 is shown in FIG. 1. The communication network 100 contains both wireless and wireline communication systems or networks. FIG. 1 will be described with respect to various communication examples. For example, User 1 wishes to speak to User 2. User 1 has a conventional wireline telephone 101, referred to as Unit 1, and User 2 has a cellular phone 109, referred to as Unit 2, such as a STARTAC™ cellular telephone available from Motorola, Inc. When User 1 wishes to speak to User 2, User 1 dials User 2's cellular phone number on Unit 1, which message is transmitted to the wireline network 103 and to a first wireless communication system 150, by first entering a switch 105 and then a base station or repeater 107, as is commonly known in the cellular communication system art. The base station or repeater 107 then transmits a wireless communication, on a control channel and containing the codes associated with both Unit 1 and Unit 2, to Unit 2, including a signal to ring Unit 2 such that User 2 is aware that a communication is pending for User 2. Normally, if User 2 desires to answer the call, User 2 answers the call using Unit 2, and Unit 2 sends an answer message on the control channel to the switch 105. The call placed by User 1 may be logged at a communication Server S 111 directly attached to the first wireless communication system 150 and may be logged at Server M 113 in the wireline communication network 103 as well. Such communication servers may be a computer with processing capability, a stored program, and memory, such as is found in commercial VME Computers available from Motorola, Inc.

In another example, User 1 may wish to speak to User 3. In this example, User 1 elects to use a computer 115, referred to as Unit 4, to send a message to User 3. Associated with User 3 is a pager 121, referred to as Unit 3, such as a BRAVO EXPRESS™ pager available from Motorola, Inc., and a two-way radio 123, referred to as Unit 5, such as a VISAR™ portable two-way radio available from Motorola, Inc., which radio is capable of voice and data transmissions as well as interconnect and dispatch transmissions. User 1, utilizing Unit 4, transmits a message via wireline network 103 which routes the call to a second wireless communication system 160, which message enters the switch 117 and is forwarded to a base station or a repeater 119. The base station or repeater 119 then repeats the message to either the pager 121 or radio 123, depending on the method in which User 1 addressed his message to User 3. Using the intersystem network shown in FIG. 1, User 2 and User 3 may communicate with various combinations of communication units as well.

Figure 2:
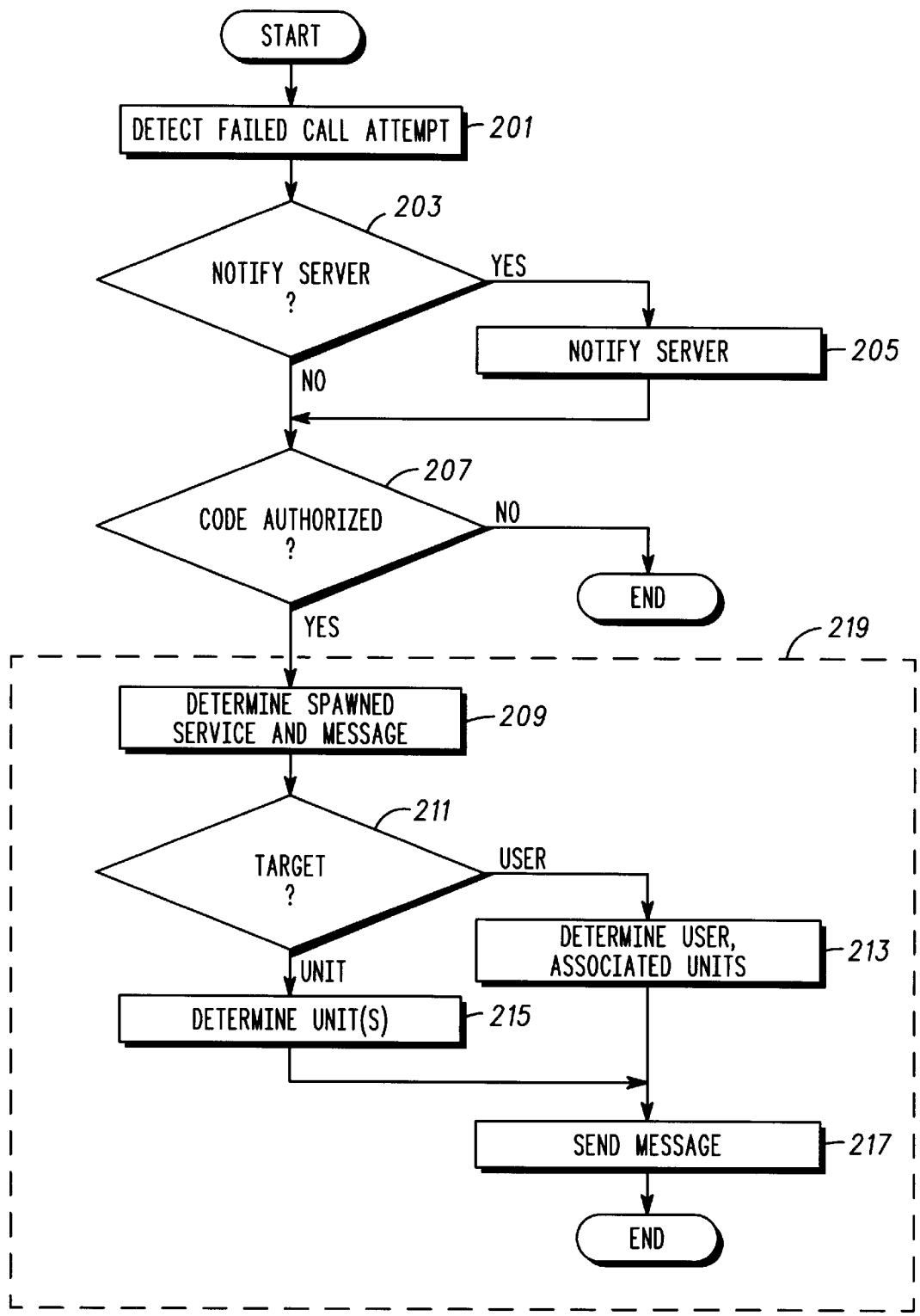
FIG. 2 is a flowchart showing a method of determining when to spawn communication services in accordance with the invention.

A flowchart showing a method of a method of determining when to spawn communication services is shown in the flowchart of FIG. 2. FIG. 2 will be described by way of example of User 1 making an attempt to communicate with User 2, as shown in FIG. 1. At step 201, a failed call attempt is detected. In this instance, User 1 attempted to communicate with User 2, and the call attempt failed. A call attempt may fail in any number of ways, including a no answer condition at the receiving communication unit, i.e., the user did not answer the phone; a busy condition is present at the receiving communication unit, i.e., User 2 is already engaged in a phone call on Unit 2; when the receiving unit is a wireless communication unit, and the unit is out of range of a communication system; the receiving communication unit is turned off; or the receiving communication unit is malfunctioning in some way that is detectable, e.g., the unit responds with irrelevant information to what it is sent, the unit transmits but does not seem to receive, and so forth. Step 201 may be performed by either Unit 2 or a communication server, such as Server S or Server M. A "no answer" condition at Unit 2, a busy condition at Unit 2, and some malfunctions may be detected by either the server or Unit 2. The server only may detect that Unit 2 is out of range of a communication system or that Unit 2 is turned off.

At step 203, it is determined if at this time a server is to be notified of the failed call attempt. Step 203 may be performed by either Unit 2 or a server, where the server determines if a different server is to be notified, and Unit 2 determines if and what server should be notified of the failed call attempt. If at step 203, a server is to be notified, the process continues with step 205, where the server is notified by sending a message to the server to be notified, which message informs that server of the failed call attempt. The message that notifies or informs the server of the failed call attempt includes, in the preferred embodiment, an identification of Unit 1 (such as a unit identification code or phone number for Unit 1), an identification of Unit 2 (such as a unit identification code or phone number for Unit 2), and a status opcode indicating a failed call attempt from the initiator, Unit 1, to the recipient, Unit 2. After step 205, the process continues with step 207. If at step 203 a server is not to be notified, the process continues with step 207.

At step 207, it is determined if a code associated with the first communication unit is an authorized code associated with the second communication unit. The determining step is performed by Unit 2 if a server was not notified or by the notified server when a server was notified at step 205. An authorized code may be a phone number, an identification code, or a password. The list of authorized codes associated with a communication unit may include any combination of phone numbers, identification codes, and/or passwords. The identification code or number may be an identification code assigned to a particular communication unit within a communication system. The password may be entered by a user of Unit 2 and must then be entered exactly by another user, such as the user of Unit 1, for the two codes to match, and thereby be authorized. Authorized codes may be entered into Unit 2 by a user of Unit 2, such that only those users who match an authorized code receive a spawned service. By not entering the phone number or identification code associated with a user for which a spawned service is not desired, and by not sharing a password with such users, User 2 can prevent a spawned service from being performed for undesirable users. Steps 207 may be performed by either Unit 2 or a server in a communication system. Whichever device, Unit 2, Server S, or Server M, performs the authorization step, would have stored the authorized codes associated with Unit 2. If the code is not authorized at step 207 the process ends, and User 1 does not become the target of a spawned service. If the code is authorized at step 207, the process continues with step 209.

At step 209, a message and a service type for spawning is determined. Spawning, generally refers to starting a second distinct process or service based on a previous process or service. A description of three types of spawned services and messages appears with respect to FIG. 3 and its associated text. Once a message is formed and the type of service is determined as a result of step 209, the process continues with step 211, where it is determined whether the spawned service is to be directed primarily at a user or a communication unit. The spawned service, however, will ultimately be directed to a communication unit that is associated with the desired targeted user of the spawned service. The spawned service is directed to a user, such as in the case when User 1 places a call attempt from Unit 1 to Unit 2. Typically, immediately following the failed call attempt to Unit 2, User 1 may still be contacted, and the user of Unit 2 wants the spawned service to effectively call back the first call originating user, no matter what device is being used. On the other hand, the spawned service may be more useful to target a communication unit, such as in the case when it is known that a given unit is either a human secretary pool or is an automated secretary of such failed call attempts.

If at step 211, the spawned service is to be primarily directed at a user, which user is typically not the second user, the process continues with step 213, where the user and units associated with the user are determined. When the spawned service is primarily directed at a user, the spawned service may target either (a) the initiator of the failed call attempt, in this example the user of Unit 1, or (b) a third party, who is neither User 1 nor User 2. The communication units associated with the targeted user are then determined, and a unit is selected as the ultimate target of the spawned service, based, for example, on the type of service spawned or type of message to be sent. The message is transmitted (sent) at step 217, and the process ends.

If at step 211, the spawned service is to be primarily directed at a unit, which unit is typically not the second unit, the process continues with step 215, where a communication unit is determined as the target of the spawned service. The type of spawned service must be compatible with the targeted unit. Some units may be able to receive data messages only, voice messages only, or both data and voice messages. Hence, that which determines the target of a spawned service (either a communication unit or a server) must be aware of the capabilities of the targeted communication unit before directing a message at that unit. A voice message should not, for example, be directed to a pager without audio capability. For example, if User 1 is the initiator, User 1 is associated with a wireline telephone 101, Unit 1, and a computer 115, Unit 4, which are both connected to the wireline network 103. It is then decided at which communication unit, Unit 1 or Unit 4, to direct the spawned service. If in the example the spawned service is a data message including the itinerary of User 2, Unit 4 would be chosen as the targeted unit. If in the example the spawned service is a voice message including a stored voice recording from User 2, Unit 1 would be chosen as the targeted unit. The message is transmitted (sent) at step 217, and the process ends.

Steps 209, 211, 213, 215, and 217, collectively 219, may be performed by either Unit 2 or a server, such as Server S or Server M. In the preferred embodiment, steps 209, 211, 213, 215, and 217, i.e., 219, comprise the spawning process. The steps 219 of the preferred embodiment provide many spawning options, including targeting a user versus a unit, selecting from among many different types of units, and providing different types of messages. Basic spawning, however, comprises only starting a second distinct process or service based on a previous process or service.

Because Server S and Server M may reside in different systems, and may reside in a system different from the one either Unit 1 or Unit 2 resides (is current registered) in, each of the steps of the flowchart of FIG. 2 may take place in Unit 2, a server in the system in which Unit 1 resides, a server in the system in which Unit 2 resides, or a different system entirely. Although only Unit 2 or Server S are capable of detecting a failed call attempt directed at Unit 2, Unit 2, Server S, or Server M can spawn a service based on that detection.

Figure 3:
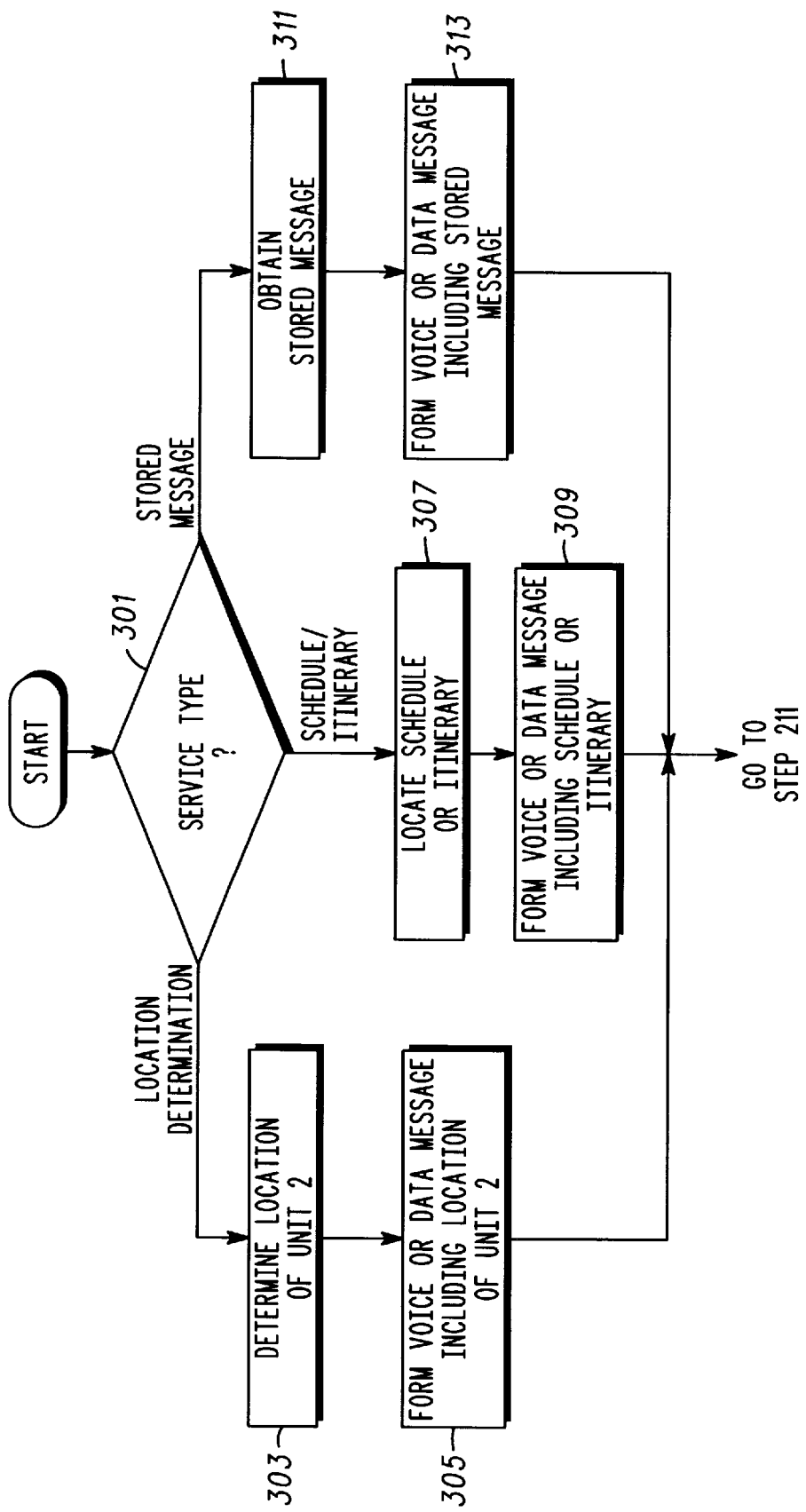
FIG. 3 is a flowchart showing methods of executing the spawning of various communication services in accordance with the invention.

A flowchart showing methods of executing the spawning of various communication services is shown in the flowchart of FIG. 3. At step 301 it is determined what type of service is to be spawned, e.g., location determination, schedule/itinerary provision, or stored message service. This determination is based in part on stored information in the determining element, such as Unit 2, Server S, or Server M. The stored information typically reflects the preferences of User 2. If location determination is the type of service to be performed at step 301, the process continues with step 303, where the location of Unit 2 is determined, and at step 305, a voice or data message is formed including the location of Unit 2, and the process continues with step 211.

If the service type at step 301 is a schedule, itinerary provision service, the process continues with step 307, where a schedule or itinerary or other type of organized message, such as an agenda, timetable, calendar, plan, or program, is located. The schedule, itinerary, other type of organized message is typically associated with User 2. Such a schedule or itinerary may be stored either at Unit 2, Server S, Server M, or at some other known location which is stored at Unit 2 such that the schedule or itinerary may be easily found. At step 309, a voice or data message is formed including the schedule or itinerary, and the process continues with step 211.

If at step 301, a stored message service is to be performed, the process continues with step 311, where a stored message is obtained. This message may be stored at Unit 2, Server S, Server M, another server, or another location which is known to provide easy access of the stored message. The stored message may be a voice message, a data message, or a synthesized voice message. This message may be a canned message, such as "I had an emergency, but I'll be back at 4:00 P.M." or "I'm at the golf course and will return in the morning." The message may also be personalized, e.g., where the user stores a message at a known location for retrieval by someone else at a later point in time. The user may also store different messages for different users to reach, based on the phone number, identification code, or password associated with the user who may call User 2. At step 313, a voice or data message including the stored message is formed, and the process continues with step 211.

Only three types of spawned services are described here, although many types of spawned services exist, such as simply giving an option for a spawned service or transmitting the status of Unit 2 or the status of User 2. A status may include diagnostic parameters and state information such as "busy," "available," "broken," or "operational." The message that is formed at step 305, step 309, or step 313 may be a voice message, a synthesized voice message, or a data message, which message is compatible with the device that will receive the spawned service, Unit 1 in the present example. The initiator of the failed call attempt may be given the option as to what type of spawned service is desired, by, for example, a prompt being given to the initiator at step 211 or step 215 of FIG. 2. The initiator of the failed call attempt may also be given the option of not receiving a spawned service. The recipient may instead be given the option of determining the spawned service, for example, by setting the spawned service based on authorized code, time of day, or on the fly, if for example, an emergency arises. The third party, determined at step 213 of FIG. 2, may also desire a service type choice should the third party have multiple communication unit types at his or her disposal.

As previously discussed, each of the steps in the flowchart may be performed by either the targeted communication unit, Unit 2 in the examples given, or a server associated either with a wireless communication system, Server S, or a wireline communication network, Server M. Any combination of performers of these steps may be successful. For example, Unit 2 may perform all of the steps of the flowchart of FIG. 2, Server S may perform all of the steps of the flowchart of FIG. 2, Server M may perform all of the steps of the flowchart of FIG. 2, with the exception of detecting the failed call attempt, or a combination may occur. For example, Unit 2 may perform step 201, Server S may perform step 203, Server S may perform step 207, and Server M may perform steps 209, 211, 213, and 215. Although only one combination is described here, the successful practice of the present invention is not limited to any combination of performers of the steps of the flowchart. As far as determining whether Unit 2, Server S, or Server M performs each of the steps of the flowchart of FIG. 2, such a decision is left in the hands of the system and communication unit designers, thereby resulting in an extremely flexible system.

If desired, more than unit may be the target of the same spawned service. In addition, more than the word one communication service may be spawned, which services may be directed at one or more communication units. A spawned service may also target the recipient, i.e., User 2, in any manner known in the art. The type of spawned service need not match the type of call or service the initiator made. For example, if User 1 attempted to page User 2, whose pager was turned off or was out of range of a paging system, User 1 may receive on Unit 1 as a spawned service a voice message stating that User 2 is out of town on business for the day or may receive on Unit 4 as a spawned service an email with User 2's agenda for the day.

The present invention provides a method that allow specified callers, in failed call attempt situations, to gain more information than was possible in prior art communication systems, and in some cases to completely satisfy the user's fundamental communication needs without actually completing a call to the original target. Simply knowing the target user's location or schedule is better for the caller than not getting a call through at all.

What is claimed is:

1. A method comprising the steps of:
    detecting a failed call attempt initiated by a first communication unit and directed to a second communication unit, wherein the first communication unit is associated with a first user and the second communication unit is associated with a second user;
    determining if a code associated with the first communication unit is an authorized code associated with the second communication unit;
    if the code is an authorized code, spawning a communication service resulting in a message directed at a user other than the second user, wherein the communication service is a location determination service, and the method further comprises the steps of determining a present location of the second communication unit and transmitting the present location of the second communication unit in the message.

2. The method of claim 1, wherein the code comprise a phone number associated with the first communication unit, an identification code associated with the first communication unit, or an entered password.

3. The method of claim 1, further comprising the step of providing to the first user an option as to what type of spawned communication service the first user desires.

4. The method of claim 1, wherein the detecting, determining, and spawning steps are performed by the second communication unit.

5. The method of claim 1, wherein the detecting, determining, and spawning steps are performed by at least one server within a communication system.

6. The method of claim 1, wherein the detecting and determining steps are performed by the second communication unit, and the spawning step is performed by at least one server within a communication system.

7. The method of claim 1, wherein the message is a voice message, a synthesized voice message, or a data message.

8. The method of claim 1, wherein the communication service is a schedule or itinerary communication service, and the method further comprises the steps of obtaining a schedule or an itinerary of a user of the second communication unit and transmitting the schedule or the itinerary of the user of the second communication unit in the message.

9. The method of claim 1, wherein the communication service is a stored message service, and the method further comprises the steps of obtaining a stored message associated with the second communication unit and transmitting the stored message in the message.

10. The method of claim 1, wherein the failed call attempt comprises a no-answer condition at the second communication unit; a busy condition at the second communication unit; the second communication unit is out of range of a communication system; the second communication unit is turned off; or the second communication unit is malfunctioning.

11. The method of claim 1, wherein the message is directed at the first user.

12. The method of claim 1, wherein the message is directed at a third user, wherein the first user, the second user, and the third user are not the same user.

13. The method of claim 1, wherein the message is directed to the first communication unit.

14. The method of claim 1, wherein the message is transmitted to a third communication unit associated with the first user, wherein the first communication unit is not the third communication unit.

15. The method of claim 14, wherein the first communication unit transmits and receives voice messages and the third communication unit transmits and receives data messages.

16. The method of claim 1, further comprising the step of sending a notification message to a server informing the server of the failed call attempt.

17. The method of claim 16, wherein the notification message includes an identification of the first communication unit, an identification of the second communication unit, and a status opcode indicating a failed call attempt from the first communication unit to the second communication unit.

18. A method comprising the steps of:
    detecting a failed call attempt initiated by a first communication unit and directed to a second communication unit;
    determining if a code associated with the first communication unit is an authorized code associated with the second communication unit;
    if the code is an authorized code, spawning a communication service resulting in a message directed at a communication unit other than the second communication unit, wherein the communication service is a location determination service, and the method further comprises the steps of determining a present location of the second communication unit and transmitting the present location of the second communication unit in the message.

19. The method of claim 18, wherein the code comprise a phone number associated with the first communication unit, an identification code associated with the first communication unit, or an entered password.

20. The method of claim 18, further comprising the step of providing to a user of the first communication unit an option as to what type of spawned communication service the user desires.

21. The method of claim 18, wherein the detecting, determining, and spawning steps are performed by the second communication unit.

22. The method of claim 18, wherein the detecting, determining, and spawning steps are performed by at least one server within a communication system.

23. The method of claim 18, wherein the detecting and determining steps are performed by the second communication unit, and the spawning step is performed by at least one server within a communication system.

24. The method of claim 18, wherein the message is a voice message, a synthesized voice message, or a data message.

25. The method of claim 18, wherein the communication service is a schedule or itinerary service, and the method further comprises the steps of obtaining a schedule or an itinerary of a user of the second communication unit and transmitting the schedule or the itinerary of the user of the second communication unit in the message.

26. The method of claim 18, wherein the communication service is a stored message service, and the method further comprises the steps of obtaining a stored message associated with the second communication unit and transmitting the stored message in the message.

27. The method of claim 18, wherein the failed call attempt comprises a no-answer condition at the second communication unit; a busy condition at the second communication unit; the second communication unit is out of range of a communication system; the second communication unit is turned off; or the second communication unit is malfunctioning.

28. The method of claim 18, wherein the message is directed to the first communication unit.

29. The method of claim 18, wherein the message is transmitted to a third communication unit associated with a user of the first communication unit, wherein the first communication unit is not the third communication unit.

30. The method of claim 29, wherein the first communication unit transmits and receives voice messages and the third communication unit transmits and receives data messages.

31. The method of claim 18, wherein the first communication unit is associated with a first user and the second communication unit is associated with a second user, wherein the message is transmitted to a third communication unit associated with a third user, wherein the first user, the second user, and the third user are not the same user.

32. The method of claim 18, further comprising the step of sending a notification message to a server informing the server of the failed call attempt.

33. The method of claim 32, wherein the notification message includes an identification of the first communication unit, an identification of the second communication unit, and a status opcode indicating a failed call attempt from the first communication unit to the second communication unit.

34. A method comprising the steps of:
    detecting a failed call attempt initiated by a first communication unit and directed to a second communication unit, wherein the first communication unit is associated with a first user and the second communication unit is associated with a second user;
    determining if a code associated with the first communication unit is an authorized code associated with the second communication unit;
    if the code is an authorized code, determining a communication service to be spawned, which communication service results in a message directed at a user other than the second user or a communication unit other than the second communication unit, wherein the communication service is a location determination service, and the method further comprises the steps of determining a present location of the second communication unit and transmitting the present location of the second communication unit in the message.

35. The method of claim 34, further comprising the step of determining whether to primarily direct the message at a user or at a communication unit.

36. The method of claim 35, further comprising the steps of, when the message is determined to be primarily directed at a user:
    determining a user at which to direct the message, yielding a targeted user;
    determining at least one communication unit associated with the targeted user, yielding a targeted unit; and
    transmitting the message to the targeted unit.

37. The method of claim 35, further comprising the steps of, when the message is determined to be primarily directed at a unit:
    determining a unit at which to direct the message, yielding a targeted unit; and
    transmitting the message to the targeted unit.

\* \* \* \* \*